(12) United States Patent
Chang et al.

(10) Patent No.: US 11,250,923 B2
(45) Date of Patent: *Feb. 15, 2022

(54) LAYOUT STRUCTURES OF MEMORY ARRAY

(71) Applicant: TAIWAN SEMICONDUCTOR MANUFACTURING COMPANY LTD., Hsinchu (TW)

(72) Inventors: Meng-Sheng Chang, Hsinchu County (TW); Yao-Jen Yang, Hsinchu County (TW); Shao-Yu Chou, Hsinchu County (TW); Yih Wang, Hsinchu (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/123,039

(22) Filed: Dec. 15, 2020

(65) Prior Publication Data

US 2021/0104287 A1 Apr. 8, 2021

Related U.S. Application Data

(63) Continuation of application No. 16/509,524, filed on Jul. 12, 2019, now Pat. No. 10,878,930.

(51) Int. Cl.
| | |
|---|---|
| *G11C 17/16* | (2006.01) |
| *G11C 7/24* | (2006.01) |
| *G11C 8/14* | (2006.01) |
| *G11C 17/18* | (2006.01) |
| *G06F 21/79* | (2013.01) |
| *G06F 12/14* | (2006.01) |

(52) U.S. Cl.
CPC .............. *G11C 17/16* (2013.01); *G06F 12/14* (2013.01); *G06F 21/79* (2013.01); *G11C 7/24* (2013.01); *G11C 8/14* (2013.01); *G11C 17/18* (2013.01)

(58) Field of Classification Search
CPC .. G11C 17/16; G11C 7/24; G11C 8/14; G11C 17/18; G11C 7/18; G11C 5/025; G06F 12/14; G06F 21/79; G06F 30/392; H01L 27/0207; H01L 27/11206
See application file for complete search history.

(56) References Cited

U.S. PATENT DOCUMENTS

| | | | |
|---|---|---|---|
| 10,878,930 B1* | 12/2020 | Chang | G11C 7/18 |
| 2006/0139995 A1* | 6/2006 | Keshavarzi | G11C 17/12 365/177 |
| 2013/0114343 A1* | 5/2013 | Chiu | H01L 29/788 365/185.18 |

* cited by examiner

*Primary Examiner* — Jay W. Radke
(74) *Attorney, Agent, or Firm* — WPAT, P.C., Intellectual Property Attorneys; Anthony King

(57) ABSTRACT

A layout method includes: forming a layout structure of a memory array having a first row, wherein the first row comprises a plurality of storage cells; disposing a word line; disposing a plurality of control electrodes for connecting the plurality of storage cells of the first row to the word line; and disposing a first cut layer on a first portion of a first control electrode of the plurality of control electrodes.

20 Claims, 9 Drawing Sheets

LAYOUT STRUCTURES OF MEMORY ARRAY

CROSS-REFERENCES

This application claims the benefit of U.S. application Ser. No. 16/509,524, filed on Jul. 12, 2019, the disclosure of which is hereby incorporated by reference in its entirety.

BACKGROUND

In an integrated circuit (IC), fuses are often used to store permanent information or form permanent connections. For example, fuses may be used to fix incorrect circuit connections and replace defective elements the IC. Fuses may also be used for chip identification or in the implementation of security features. Fuses may also be used for analog trimming or calibration to improve the circuit function. Fuses may also be used for inventory control by enabling or disabling features in the IC. Fuses may also be used as one time programmable (OTP) memory elements that can be programmed once the chip is in packaged form. One time programmable memory elements are used in the IC to provide non-volatile memory ("NVM"). Data in NVM are not lost when the IC is turned off. NVM allows an IC manufacturer to store lot number and security data on the IC, for example, and is useful in many other applications. One type of NVM is commonly called an electrical fuse (E-fuse). However, a person may get the manufacturer's proprietary code or information embedded in the E-fuses through the way of reverse engineering (e.g. physical failure analysis, PFA). Therefore, there is an urgent need to enhance the security of fuse array in the IC.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
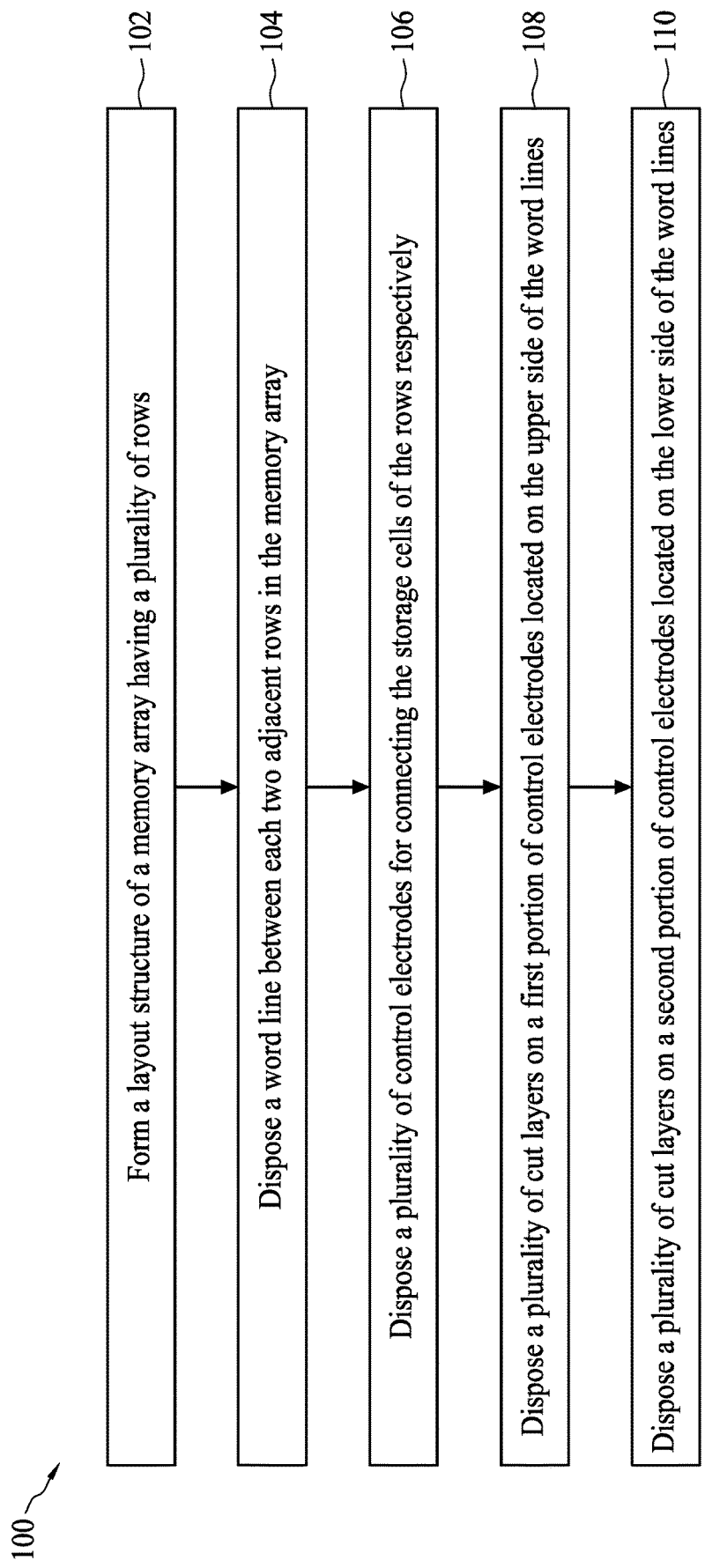
FIG. 1 is a flowchart illustrating a layout method for forming a layout structure of a memory array according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

E-fuses are usually integrated into semiconductor ICs by using a narrow stripe of conducting material (metal, polysilicon, etc.) between two pads, generally referred to as anode and cathode. Applying a programming current to the E-fuse to destroy or fuse the link, thus changing the resistance of the E-fuse. This is commonly referred to as "programming" the E-fuse. The fuse state (i.e. programmed or non-programmed) may be read by using a sense circuit.

During programming, current is applied through the fuse link for a specified period. The programming current heats up the fuse link more than the adjacent areas due to current crowding and differences in heat dissipation, creating a temperature gradient. The temperature gradient and the carrier flux causes electro- and stress-migration to take place and drive material (e.g., silicide, dopant, and polysilicon) away from the fuse link.

Programming generally converts the E-fuse from an original resistance to a programmed resistance. It is desirable for the programmed resistance to be much higher (typically many orders of magnitude higher) than the original resistance to allow reliable reading of the E-fuse using a sensing circuit. A first logic state (e.g., a logical "0") is typically assigned to a non-programmed, low-resistance fuse state, and a second logic state (e.g., a logical "1") to the programmed, high-resistance fuse state. The change in resistance is sensed (read) by a sensing circuit to produce a data bit.

FIG. 1 is a flowchart illustrating a layout method 100 for forming a layout structure of a memory array according to some embodiments. The layout method 100 is executable by a processor or manual. Some of the operations in the layout method 100 may by manually executed. The layout method 100 may be compiled in a computer readable program. The computer readable program may be stored in a memory device. The processor may read or reload the computer readable program from the memory device to execute the layout method 100 upon the layout structure of the memory array. The layout structure of the memory array is composed of a plurality of storage cells. Storage cells may be pre-designed and stored in cell libraries. Generally speaking, the layout method 100 is designed to assign the storage cells to a plurality of word lines of the memory array respectively. Specifically, the layout method 100 is designed to dispose a plurality of cut layers on the polysilicon line(s) of the storage cells to cut the polysilicon line(s) such that each storage cell may be coupled to a corresponding word line. The cut layers are also referred as cut-poly layers (CPO).

According to some embodiments, the layout method 100 comprises operations 102~106. In operation 102, a layout structure of a memory array having a plurality of rows is formed. Each row comprises a plurality of storage cells. The memory array may be a fusible memory array. Thus, the storage cells may comprises a plurality of fuses respectively.

In operation 104, a plurality of word lines are horizontally disposed on the memory array. Specifically, each word line is disposed between each two adjacent rows in the memory array.

In operation 106, a plurality of control electrodes are vertically disposed on the memory array for connecting the plurality of storage cells in the plurality of rows respectively. Each of the control electrodes comprises at least one polysilicon line. In this embodiment, each of the control electrodes comprises a plurality of polysilicon lines.

In operation 108, for each word line, a plurality of cut layers are disposed on a first portion of the control electrodes located on the upper side of the word line such that the first portion of the control electrodes is cut and separated from the word line after the fabrication. Specifically, each of the cut layers is located between the upper side of the word line and a corresponding storage cell connecting to the corresponding control electrode.

According to some embodiments, for each control electrode in the first portion of the control electrodes, the cut layer may dispose on a portion or all of the polysilicon lines of the control electrode.

According to some embodiments, for a cut layer, the cut layer may dispose on a plurality of consecutive control electrodes in the first portion of the control electrodes. For example, a cut layer may dispose on two or three consecutive control electrodes of the storage cells.

In operation 110, for each word line, a plurality of cut layers are disposed on a second portion of the control electrodes located on the lower side of the word line such that the second portion of the control electrodes is cut and separated from the word line after the fabrication. Specifically, each of the cut layers is located between the lower side of the word line and a corresponding storage cell connecting to the corresponding control electrode.

According to some embodiments, for each control electrode in the second portion of the control electrodes, the cut layer may dispose on a portion or all of the polysilicon lines of the control electrode.

According to some embodiments, for a cut layer, the cut layer may dispose on a plurality of consecutive control electrodes in the second portion of the control electrodes. For example, a cut layer may dispose on two or three consecutive control electrodes of the storage cells.

In addition, for a word line, the first portion of the control electrodes may different from the second portion of the control electrodes.

According to some embodiments, for a word line, the first portion of the control electrodes and the second portion of the control electrodes are located on different columns of the memory array respectively.

According to some embodiments, for a word line and for a column, the first portion of the control electrodes may partially overlap with the second portion of the control electrodes.

According to the operations 108 and 110, a processor is arranged to scramble or randomly scramble the cut layers and disposed the scrambled cut layers on the control electrodes of the storage cells. The cut layers are configured to cut the control electrodes such that the corresponding storage cells are separated from the word line.

When the layout structure of the memory array is designed, a fabrication process may be performed to fabricate a physical memory array of the layout structure.

As the cut layers disposed on the control electrodes are scrambled, the control electrodes of the storage cells in the memory array may irregularly distributed, which may prevent a person from getting the manufacturer's proprietary code or information embedded in the memory array 100 through the way of reverse engineering.

According to some embodiments, the storage cell may be formed by a field-effect transistor (FET), and the polysilicon lines (i.e. the control electrode) is disposed on the diffusion area or active area of the field-effect transistor for inducing a magnetic field on the diffusion area. Therefore, the polysilicon line(s) may be regarded as a gate terminal of the field-effect transistor.

Figure 2:
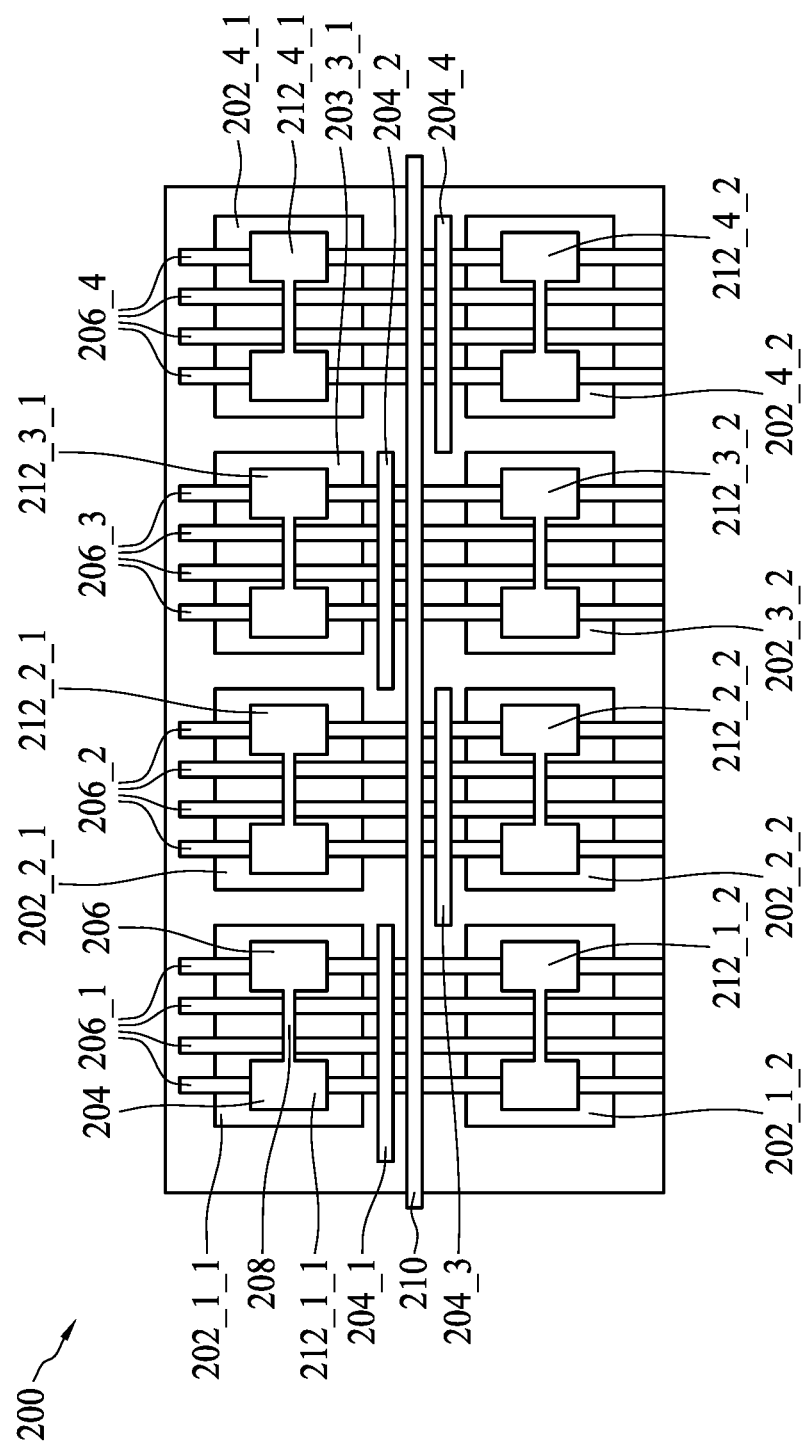
FIG. 2 is a diagram illustrating a layout structure of a memory array in accordance with some embodiments.

FIG. 2 is a diagram illustrating a layout structure 200 of a memory array in accordance with some embodiments. The layout structure 200 comprises a plurality of a plurality of storage cells 202_1_1-202_4_2, a plurality of cut layers 204_1-204_4, and a plurality of polysilicon lines (or control electrodes) 206_1-206_4. The storage cells 202_1_1-202_4_2 are coupled to a plurality of fuses 212_1_1-212_4_2 respectively. The fuses are coupled to the drains (or sources) of the corresponding transistors of the storage cells respectively. The fuses 212_1_1-212_4_2 may be metal fuses. According to some embodiments, each of the fuses 212_1_1-212_4_2 comprises a first pad (e.g. 204), a second pad (e.g. 206), and a link or stripe (e.g. 208). When the layout structure 200 is fabricated and before programming, the link 208 is arranged to connect the first pad and the second pad. One of the first pad and the second pad is arranged to couple to the drain (or source) of the corresponding transistor of the storage cell, and the other pad (i.e. bit line) is coupled to the sensing circuit for outputting the data. During programming, current is applied through the link to destroy or fuse the link, thus changing the resistance of the fuse.

In addition, the cut layers 204_1-204_4 may be the mask used to cut the polysilicon layer where the cut-poly layer is disposed on during the manufacturing process. In this embodiment, the cut layers 204_1-204_4 are cut-poly layer. According to some embodiments, the cut layer 204_1 is located on the upper side of the conductive path 210, and disposed on the polysilicon lines 206_1 of the corresponding storage cells. The cut layer 204_2 is located on the upper side of the conductive path 210, and disposed on the polysilicon lines 206_3 of the corresponding storage cells. The cut layer 204_3 is located on the lower side of the conductive path 210, and disposed on the polysilicon lines 206_2 of the corresponding storage cells. The cut layer 204_4 is located on the lower side of the conductive path 210, and disposed on the polysilicon lines 206_4 of the corresponding storage cells.

Figure 3:
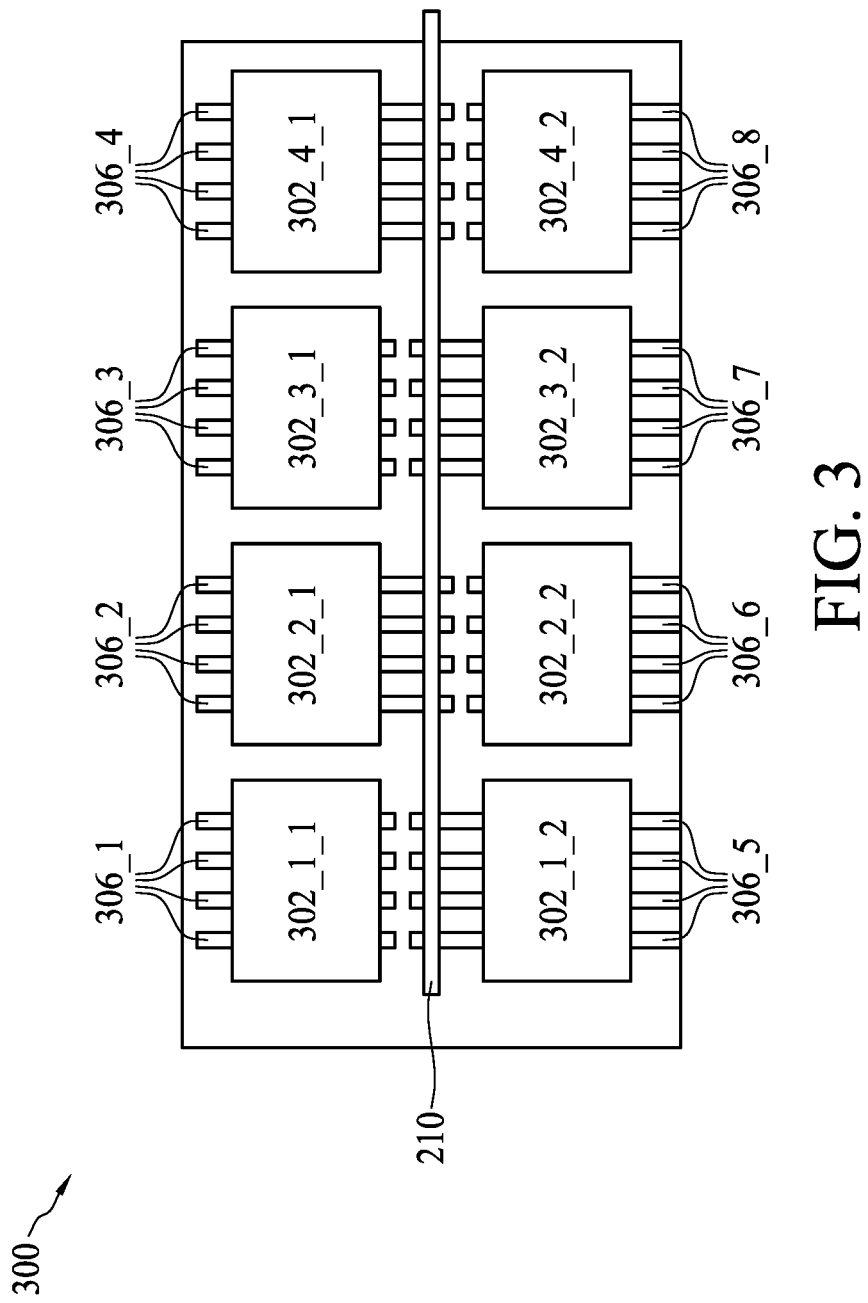
FIG. 3 is a diagram illustrating a memory array in accordance with some embodiments.

FIG. 3 is a diagram illustrating a memory array 300 in accordance with some embodiments. The memory array 300 may be the physical circuit of the layout structure 200. For brevity, some numerals in the memory array 300 in FIG. 3 are arranged to be similar to the numerals of the layout structure 200 in FIG. 2. The memory array 300 comprises a plurality of storage cells 302_1_1-302_4_2. The storage cells 302_1_1-302_4_1 are arranged to be a first row, and the storage cells 302_1_2-302_4_2 are arranged to be a second row. The conductive path 210 is horizontally disposed between the first row and the second row.

The memory array 300 further comprises a plurality of first polysilicon lines (or control electrodes) 306_1, a plurality of second polysilicon lines 306_2, a plurality of third polysilicon lines 306_3, a plurality of fourth polysilicon lines 306_4, a plurality of fifth polysilicon lines 306_5, a plurality of sixth polysilicon lines 306_6, a plurality of seventh polysilicon lines 306_7, and a plurality of eighth poly silicon lines 306_8. The polysilicon lines 306_1-306_8 are vertically disposed in the storage cells 302_1_1-302_m_n respectively. Specifically, the cut layer 204_1 is arranged to cut the polysilicon lines 206_1 to form the polysilicon lines 306_1 and 306_5 during the fabrication process. The cut layer 204_2 is arranged to cut the polysilicon lines 206_3 to form the polysilicon lines 306_3 and 306_7 during the fabrication process. The cut layer 204_3 is arranged to cut the polysilicon lines 206_2 to form the polysilicon lines 306_2 and 306_6 during the fabrication process. The cut layer 204_4 is arranged to cut the polysilicon lines 206_4 to form the polysilicon lines 306_4 and 306_8 during the fabrication process.

According to some embodiments, the conductive path 210 is electrically coupled to the polysilicon lines 306_2, 306_4, 306_6, and 306_8, and the conductive path 210 is not coupled to the polysilicon lines 306_1, 306_3, 306_5, and 306_7. Therefore, the conductive path 210 may be the word line of the storage cells 302_2_1, 302_4_1, 302_1_2, and 302_3_2. When the voltage level of the conductive path 210 is activated, e.g. the high voltage level for N-type transistor or the low voltage level for P-type transistor, the data (i.e. the logic state) in the storage cells 302_2_1, 302_4_1, 302_1_2, and 302_3_2 may be selected and read out by a sensing circuit. In other words, in the memory array 300, the storage cells selected by the word line (i.e. 210) are not disposed on the same side of the word line. According to the embodiment, some storage cells (e.g. 302_2_1 and 302_4_1) are disposed on the upper side of the word line while the other storage cells (e.g. 302_1_2 and 302_3_2) are disposed on the lower side of the word line. Moreover, on the upper side of the word line (i.e. 210), the storage cells (e.g. 302_2_1 and 302_4_1) coupled to the word line are not consecutive storage cells. The storage cells 302_2_1 and 302_4_1 are separated by the storage cell 302_3_1. On the lower side of the word line (i.e. 210), the storage cells (e.g. 302_1_2 and 302_3_2) coupled to the word line are not consecutive storage cells. The storage cells 302_1_2 and 302_3_2 are separated by the storage cell 302_2_2.

Accordingly, in this embodiment, the storage cells 302_2_1, 302_4_1, 302_1_2, and 302_3_2 coupled to the word line (i.e. 210) are arranged to be a Zigzag pattern. The Zigzag arrangement for the storage cells 302_2_1, 302_4_1, 302_1_2, and 302_3_2 may prevent a person from getting the manufacturer's proprietary code or information embedded in the memory array 100 through the way of reverse engineering (e.g. physical failure analysis, PFA).

It is noted that the storage cells 302_1_1 and 302_3_1 and the storage cells 302_2_2 and 302_4_2 may be controlled by other word lines (not shown in FIG. 3) respectively.

Figure 4:
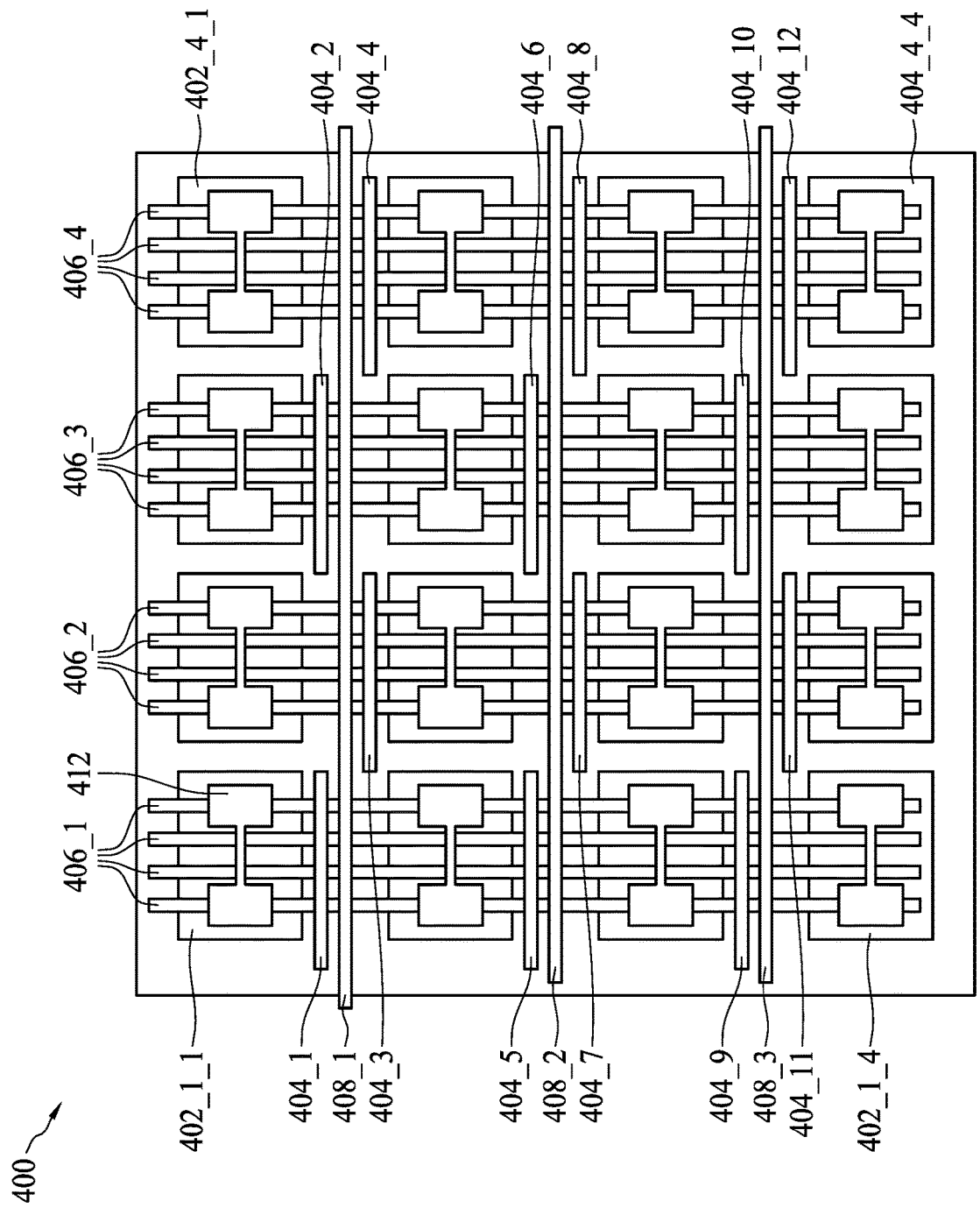
FIG. 4 is a diagram illustrating a layout structure of a memory array in accordance with some embodiments.

FIG. 4 is a diagram illustrating a layout structure 400 of a memory array in accordance with some embodiments. The layout structure 400 comprises a plurality of storage cells 402_1_1-402_4_4, a plurality of cut layers 404_1-404_12, and a plurality of polysilicon lines 406_1-406_4. The storage cells 402_1_1-402_4_4 are coupled to a plurality of fuses (e.g. 412) respectively. The fuses are coupled to the drains (or sources) of the corresponding transistors of the storage cells respectively. The structure of each of the fuses is similar to the structure of the fuses 212_1_1-212_4_2, thus the detailed description is omitted here for brevity.

In addition, the cut layers 404_1-404_4 are arranged to cut the polysilicon lines 406_1-406_4 during the manufacturing process such that the storage cells coupled to the conductive path 408_1 form a first Zigzag pattern. The cut layers 404_5-404_8 are arranged to cut the polysilicon lines 406_1-406_4 during the manufacturing process such that the storage cells coupled to the conductive path 408_2 form a second Zigzag pattern. The cut layers 404_9-404_12 are arranged to cut the polysilicon lines 406_1-406_4 during the manufacturing process such that the storage cells coupled to the conductive path 408_3 form a third Zigzag pattern. Specifically, the cut layers 404_1, 404_5, and 404_9 are disposed on the polysilicon lines 406_1 and located on the upper side of the conductive paths 304_1-304_3 respectively. The cut layers 404_2, 404_6, and 404_10 are disposed on the polysilicon lines 406_3 and located on the upper side of the conductive paths 304_1-304_3 respectively. The cut layers 404_3, 404_7, and 404_11 are disposed on the polysilicon lines 406_2 and located on the lower side of the conductive paths 304_1-304_3 respectively. The cut layers 404_4, 404_8, and 404_12 are disposed on the polysilicon lines 406_4 and located on the lower side of the conductive paths 304_1-304_3 respectively.

Figure 5:
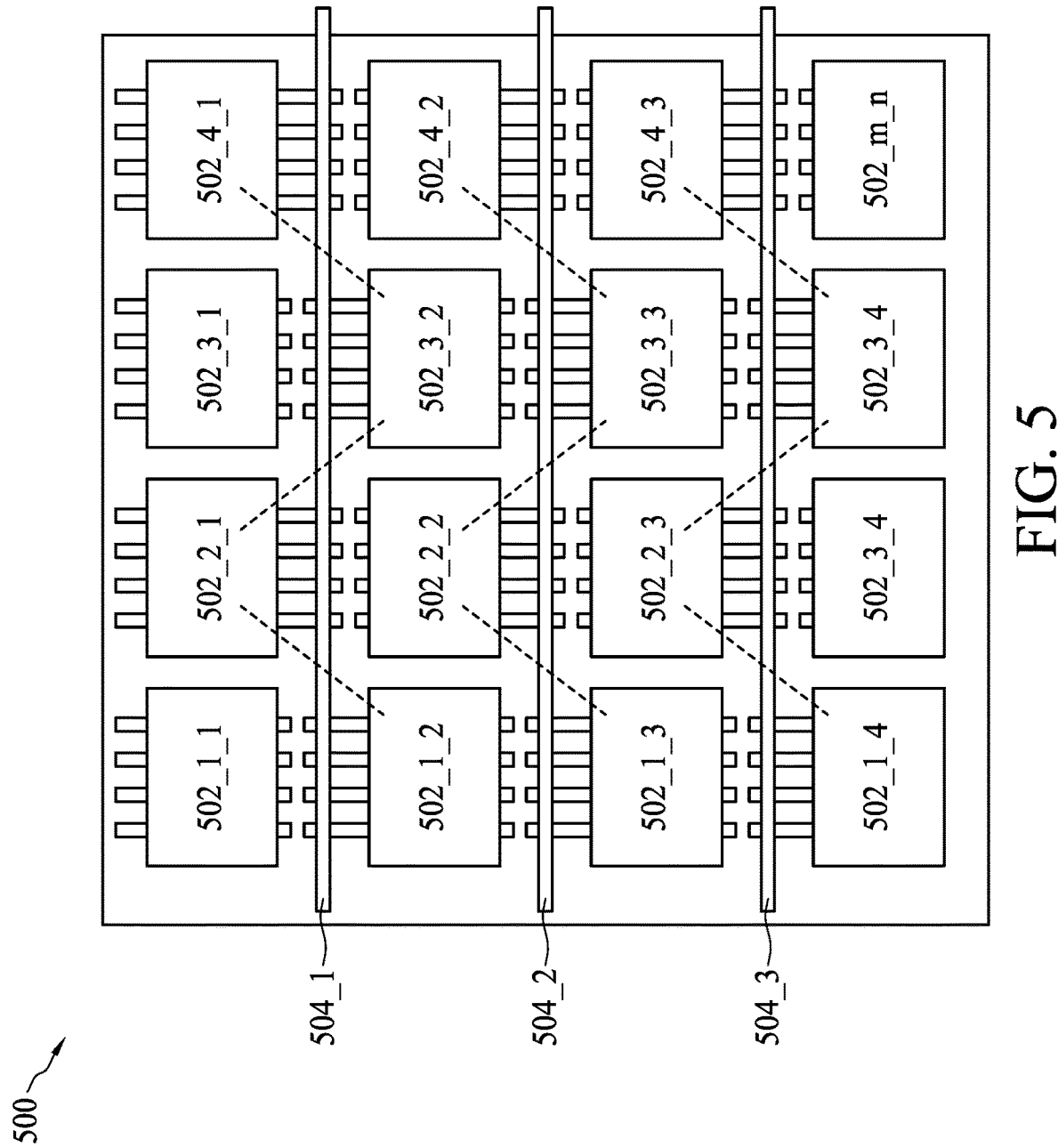
FIG. 5 is a diagram illustrating a memory array in accordance with some embodiments.

FIG. 5 is a diagram illustrating a memory array 500 in accordance with some embodiments. The memory array 500 may be the physical circuit of the layout structure 400. The memory array 500 comprises a plurality of storage cells 502_1_1-502_m_n. The parameters "m" and "n" are integer not less than 1. For the example of this embodiment, the parameters "m" and "n" are 4. The storage cells 502_1_1-502_4_1 are arranged to be a first row, the storage cells 502_1_2-502_4_2 are arranged to be a second row, the storage cells 502_1_3-502_4_3 are arranged to be a third row, and the storage cells 502_1_4-502_4_4 are arranged to be a fourth row. The memory array 500 further comprises a plurality of conductive paths 504_1-504_3. The conductive path 504_1 is horizontally disposed between the first row and the second row, the conductive path 504_2 is horizontally disposed between the second row and the third row, and the conductive path 504_3 is horizontally disposed between the third row and the fourth row.

After the fabrication process of the layout structure 400, due to the cut layers 404_1-404_4, the storage cells 502_2_1, 502_4_1, 502_1_2, and 502_3_2 coupled to the first word line (i.e. 504_1) form a first Zigzag pattern (e.g. the dashed line in FIG. 5). Due to the cut layers 404_5-404_8, the storage cells 502_2_2, 502_4_2, 502_1_3, and 502_3_3 coupled to the second word line (i.e. 504_2) form a second Zigzag pattern. Due to the cut layers 404_9-404_12, the storage cells 502_2_3, 502_4_3, 502_1_4, and 502_3_4 coupled to the third word line (i.e. 504_3) form a third Zigzag pattern.

According to some embodiments, in the top row (i.e. the first row), the storage cells 502_1_1 and 502_3_1 are not coupled to word line, thus the storage cells 502_1_1 and 502_3_1 may be the dummy cells of the memory array 500. Similarly, in the bottom row (i.e. the fourth row), the storage cells 502_2_4 and 502_4_4 are not coupled to word line, thus the storage cells 502_2_4 and 502_4_4 may also be the dummy cells of the memory array 300. According to some embodiments, the fuses of the dummy cells (i.e. 502_1_1, 502_3_1, 502_2_4, and 502_4_4) may not be fused during the programming. Therefore, the links connecting the pads in the fuses of the dummy cells are kept intact after the programming.

Figure 6:
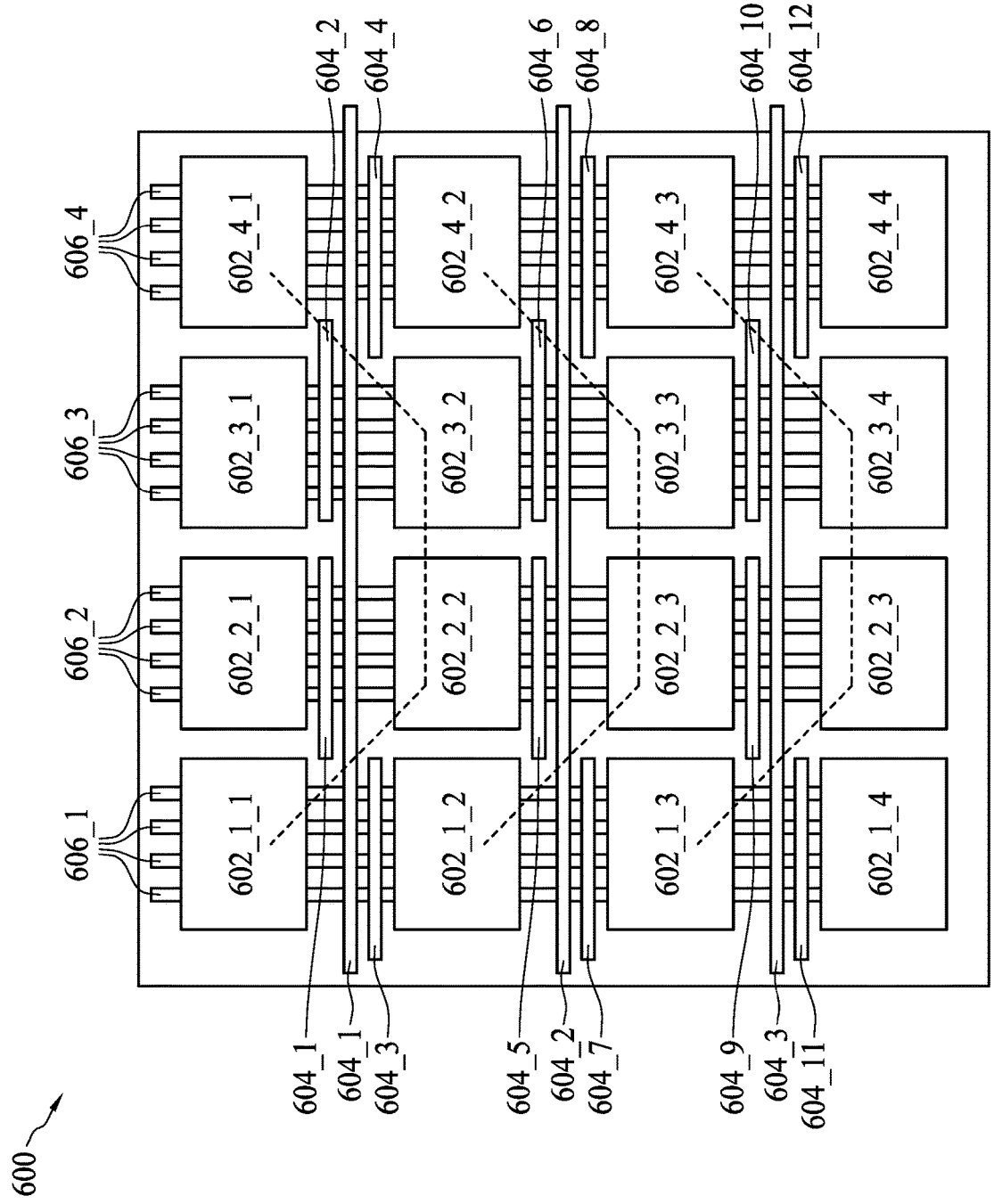
FIG. 6 is a diagram illustrating a layout structure of a memory array in accordance with some embodiments.

According to some embodiments, the cut layers 404_1-404_1_2 may be arranged to cut the polysilicon lines 406_1, 406_2, 406_3, and 406_4 to form another pattern of storage cells as shown in FIG. 6. FIG. 6 is a diagram illustrating a layout structure 600 of a memory array in accordance with some embodiments. The layout structure 600 comprises a plurality of storage cells 602_1_1-602_4_4. The storage cells 602_1_1-602_4_1 are arranged to be a first row, the storage cells 602_1_2-602_4_2 are arranged to be a second row, the storage cells 602_1_3-602_4_3 are arranged to be a third row, and the storage cells 602_1_4-602_4_4 are arranged to be a fourth row. The layout structure 600 further comprises a plurality of conductive paths 608_1-608_3. The conductive path 608_1 is horizontally disposed between the first row and the second row, the conductive path 608_2 is horizontally disposed between the second row and the third row, and the conductive path 608_3 is horizontally disposed between the third row and the fourth row.

In this embodiment, the cut layers 604_1, 604_5, and 604_9 are disposed on the polysilicon lines 606_2 and located on the upper side of the conductive paths 608_1-608_3 respectively. The cut layers 604_2, 604_6, and 604_10 are disposed on the polysilicon lines 606_3 and located on the upper side of the conductive paths 608_1-608_3 respectively. The cut layers 604_3, 604_7, and 604_11 are disposed on the polysilicon lines 606_1 and located on the lower side of the conductive paths 608_1-608_3 respectively. The cut layers 604_4, 604_8, and 604_12 are disposed on the polysilicon lines 606_4 and located on the lower side of the conductive paths 608_1-608_3 respectively.

According to some embodiments, the storage cells 602_2_1, 602_2_2, 602_3_2, and 602_4_1 coupled to the first word line (i.e. 608_1) are arranged to be a first U-shape pattern (e.g. the dashed line in FIG. 6). The storage cells 602_1_2, 602_2_3, 602_3_3, and 602_4_2 coupled to the second word line (i.e. 608_2) are arranged to be a second U-shape pattern. The storage cells 602_1_3, 602_2_4, 602_3_4, and 602_4_3 coupled to the third word line (i.e. 608_3) are arranged to be a third U-shape pattern.

Figure 7:
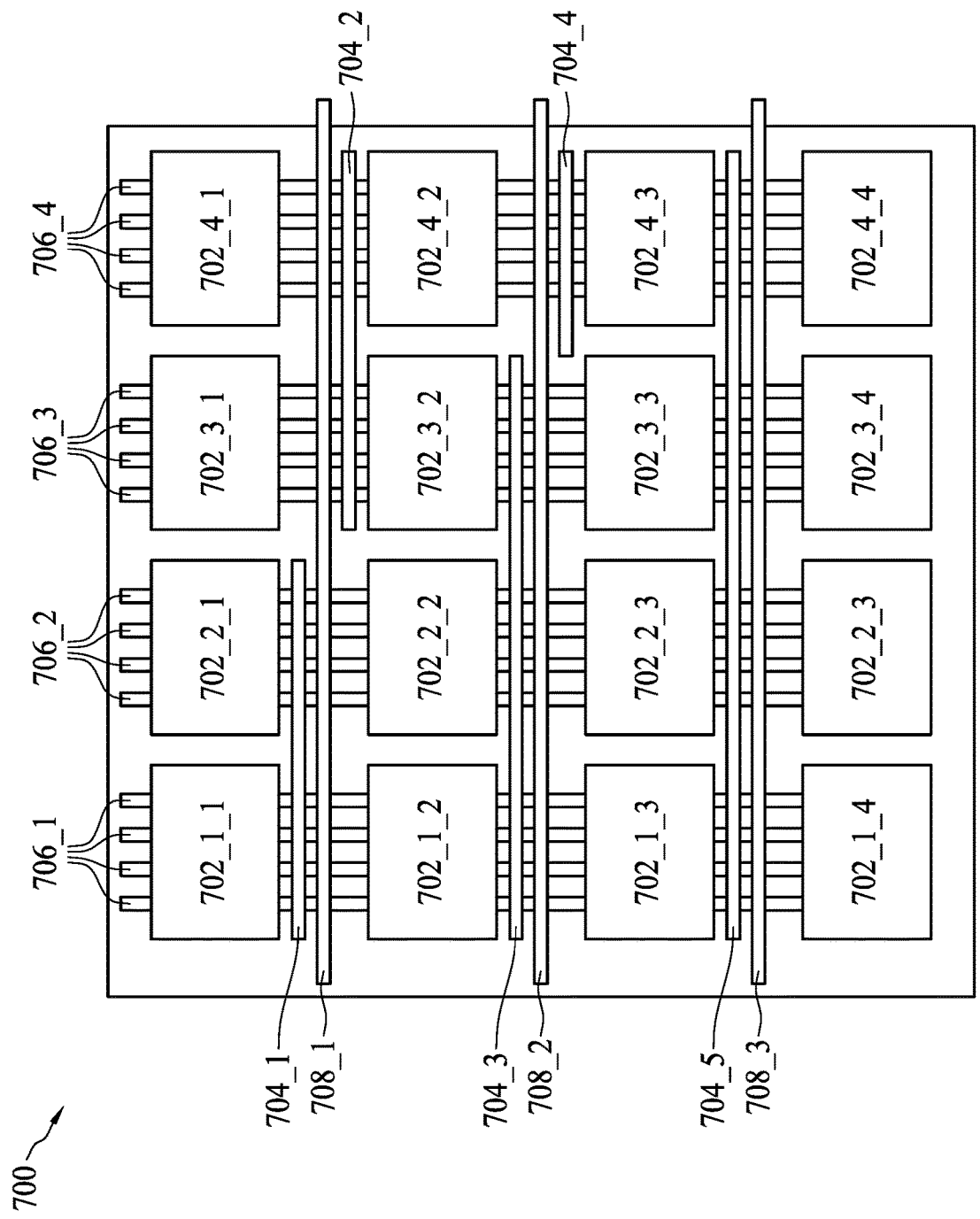
FIG. 7 is a diagram illustrating a layout structure of a memory array in accordance with some embodiments.

In the above embodiments, each of the cut layers is arranged to cut the polysilicon lines of one storage cell. However, this is not the limitation of the present embodiments. A cut layer may be arranged to cut the polysilicon lines of more than one storage cell as shown in FIG. 7. FIG. 7 is a diagram illustrating a layout structure 700 of a memory array in accordance with some embodiments. The layout structure 700 comprises a plurality of storage cells 702_1_1-702_4_4. The storage cells 702_1_1-702_4_1 are arranged to be a first row, the storage cells 702_1_2-702_4_2 are arranged to be a second row, the storage cells 702_1_3-702_4_3 are arranged to be a third row and the storage cells 702_1_4-702_4_4 are arranged to be a fourth row. The memory array 700 further comprises a plurality of conductive paths 708_1-708_3. The conductive path 708_1 is horizontally disposed between the first row and the second row, the conductive path 708_2 is horizontally disposed between the second row and the third row, and the conductive path 708_3 is horizontally disposed between the third row and the fourth row.

In this embodiment, the cut layer 704_1 is disposed on the polysilicon lines 706_1 and 706_2 and located on the upper side of the conductive paths 708_1. The cut layer 704_2 is disposed on the polysilicon lines 706_3 and 706_4 and located on the lower side of the conductive paths 708_1. The cut layer 704_3 is disposed on the polysilicon lines 706_1, 706_2, and 706_3, and located on the upper side of the conductive paths 708_2. The cut layer 704_4 is disposed on the polysilicon lines 706_4 and located on the lower side of the conductive paths 708_2. The cut layer 704_5 is disposed on the polysilicon lines 706_1, 706_2, 706_3, and 706_4, and located on the upper side of the conductive paths 708_3.

According to some embodiments, in a memory array, the cut layers 704_1-704_5 may be randomly selected and disposed on appropriate positions for cutting the polysilicon lines to form a specific pattern of storage cells. Then, the control electrodes of the storage cells in the memory array may irregularly distributed, and a person may be prevented from getting the manufacturer's proprietary code or information embedded in the memory array through the way of reverse engineering. It is noted that the specific pattern is a known pattern for the manufacturer.

Figure 8:
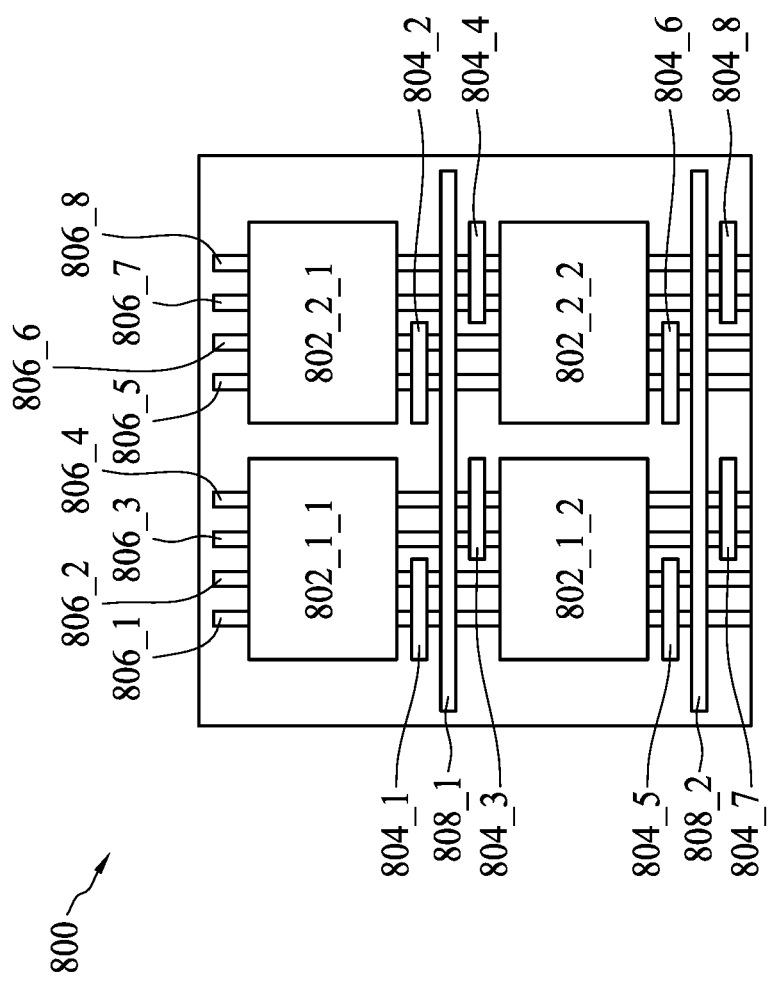
FIG. 8 is a diagram illustrating a layout structure of a memory array in accordance with some embodiments.

In the embodiment of FIG. 7, a cut layer is arranged to cut the polysilicon lines of more than one storage cell. However, this is not the limitation of the present embodiments. A cut layer may be arranged to cut a portion of the polysilicon lines of a storage cell as shown in FIG. 8. The portion of the polysilicon lines may be odd number or even number of polysilicon lines of a storage cell. FIG. 8 is a diagram illustrating a layout structure 800 of a memory array in accordance with some embodiments. The layout structure 800 comprises a plurality of storage cells 802_1_1-802_2_2. The storage cells 802_1_1-802_2_1 are arranged to be a first row, and the storage cells 802_1_2-802_2_2 are arranged to be a second row. The memory array 800 further comprises a plurality of conductive paths 808_1-808_2. The conductive path 808_1 is horizontally disposed between the first row and the second row, and the conductive path 808_2 is horizontally disposed on the bottom of the second row.

In this embodiment, the cut layer 804_1 is disposed on the polysilicon lines 806_1 and 806_2 of the storage cell 802_1_1 and located on the upper side of the conductive paths 808_1. The cut layer 804_2 is disposed on the polysilicon lines 806_5 and 806_6 of the storage cell 802_2_1 and located on the upper side of the conductive paths 808_1. The cut layer 804_3 is disposed on the polysilicon lines 806_3 and 806_4 of the storage cell 802_1_1 and located on the lower side of the conductive paths 808_1. The cut layer 804_4 is disposed on the polysilicon lines 806_7 and 806_8 of the storage cell 802_2_1 and located on the lower side of the conductive paths 808_1.

The cut layer 804_5 is disposed on the polysilicon lines 806_1 and 806_2 of the storage cell 802_1_1 and located on the upper side of the conductive paths 808_2. The cut layer 804_6 is disposed on the polysilicon lines 806_5 and 806_6 of the storage cell 802_2_1 and located on the upper side of the conductive paths 808_2. The cut layer 804_7 is disposed on the polysilicon lines 806_3 and 806_4 of the storage cell 802_1_1 and located on the lower side of the conductive paths 808_2. The cut layer 804_8 is disposed on the polysilicon lines 806_7 and 806_8 of the storage cell 802_2_1 and located on the lower side of the conductive paths 808_2.

After the fabrication, for example, the polysilicon lines 806_1 and 806_2 are disconnected from the conductive path 808_1 while the polysilicon lines 806_3 and 806_4 are connected to the conductive path 808_1.

In this embodiment, a cut layer is arranged to cut two polysilicon lines of a storage cell. However, this is not a limitation of the present embodiment. A cut layer may be arranged to cut one, two, three, or four polysilicon lines of a storage cell. Moreover, the cut layers 804_1-804_8 may be arranged to randomly cut the polysilicon lines 806_1-806_8 to form a specific pattern of storage cells. It is noted that the specific pattern is a known pattern for the manufacturer.

According to some embodiments, the type of cut layers as shown in FIG. 6, the type of cut layers as shown in FIG. 7, and the type of cut layers as shown in FIG. 8 may be selected and disposed on the polysilicon lines in a memory array to form an irregular pattern of storage cells.

Briefly, in the present embodiments, the storage cells of a row in a memory array are not coupled to the same side of a word line. For a word line in the memory array, a portion of the storage cells may be disposed on the upper side of the word line while the other portion of the storage cells may be disposed on the lower side of the word line. In other words, the control electrodes of the storage cells in the memory array may irregularly distributed. Therefore, a person may be prevented from getting the manufacturer's proprietary code or information embedded in the memory array through the way of reverse engineering, and the security of the memory array may be enhanced.

Figure 9:
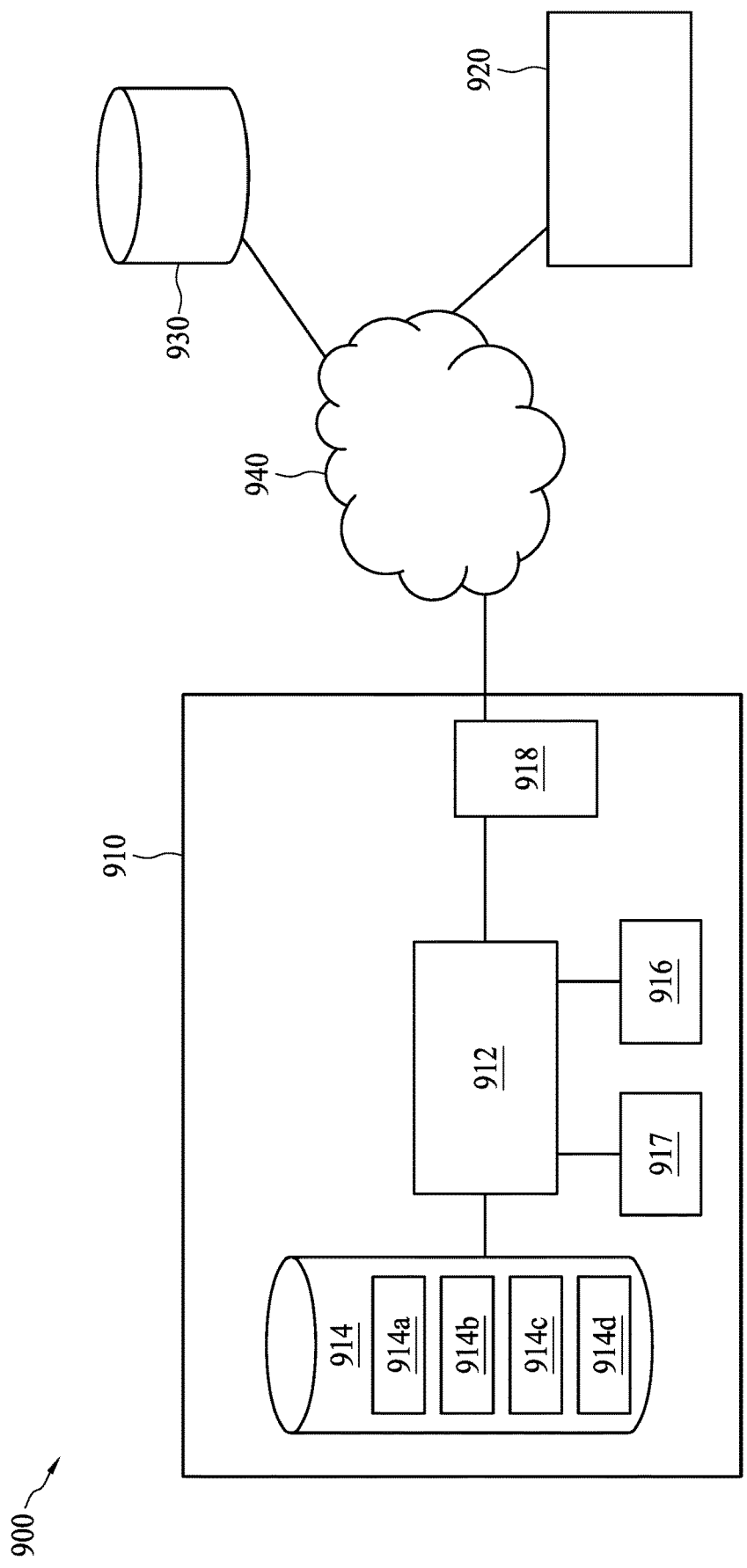
FIG. 9 is a functional block diagram of an integrated circuit design and a modeling system in accordance with an embodiment.

FIG. 9 is a functional block diagram of an integrated circuit design and modeling system 900 in accordance with an embodiment. Integrated circuit design and modeling system 900 includes a first computer system 910, a second computer system 920, a networked storage device 930, and a network 940 connecting the first computer system 910, the second computer system 920, and the networked storage device 930. In some embodiments, one or more of the second computer system 920, the storage device 930, and the network 940 are omitted. In some embodiments, two or more of the first computer system 910, second computer system 920, and/or storage device 930 are combined into a single computer system.

The first computer system 910 includes a hardware processor 912 communicatively coupled with a non-transitory, computer readable storage medium 914 encoded with, i.e., storing, a generated integrated layout 914a, a circuit design 914b, a computer program code 914c, i.e., a set of executable instructions, and a standard cell library 914d having layout patterns as described herein. The processor 912 is electrically and communicatively coupled with the computer readable storage medium 914. The processor 912 is configured to execute the set of instructions 914c encoded in the computer readable storage medium 914 in order to cause the computer 910 to be usable as a placing and routing tool for generating a layout design based on the standard cell library 914d. The processor 912 is also configured to execute the set of instructions 914c encoded in the computer readable storage medium 914 in order to cause the computer 910 to perform the operations 102~106 of the layout method 100.

In some embodiments, standard cell library 914d is stored in a non-transitory storage medium other than storage medium 914. In some embodiments, standard cell library 914d is stored in a non-transitory storage medium in networked storage device 930 or second computer system 920. In such case, standard cell library 914d is accessible by the processor 912 through the network.

In some embodiments, the processor 912 is a central processing unit (CPU), a multi-processor, a distributed processing system, an application specific integrated circuit (ASIC), and/or a suitable processing unit.

In some embodiments, the computer readable storage medium 914 is an electronic, magnetic, optical, electromagnetic, infrared, and/or a semiconductor system (or apparatus or device). For example, the computer readable storage medium 914 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 2214 includes a compact disk-read only memory (CD-ROM), a compact disk-read/write (CD-R/W), and/or a digital video disc (DVD).

The computer system 910 includes, in at least some embodiments, an input/output interface 916 and a display unit 2217. The input/output interface 916 is coupled to the controller 912 and allows the circuit designer to manipulate the first computer system 910. In at least some embodiments, the display unit 917 displays the status of executing the placing and routing tool 914a in a real-time manner and provides a Graphical User Interface (GUI). In at least some embodiments, the input/output interface 2216 and the display 917 allow an operator to operate the computer system 910 in an interactive manner.

It is noted that the term "metal" mentioned in the above embodiments is merely an exemplary conductive material, and this is not a limitation of the present embodiments.

In some embodiments, the present disclosure provides a layout method. The layout method may include: forming a layout structure of a memory array having a first row, wherein the first row comprises a plurality of storage cells; disposing a word line; disposing a plurality of control electrodes for connecting the plurality of storage cells of the first row to the word line; and disposing a first cut layer on a first portion of a first control electrode of the plurality of control electrodes.

In some embodiments, the present disclosure provides a layout structure. The layout structure may include a first row comprising a plurality of storage cells; a word line, a plurality of control electrodes for connecting the plurality of storage cells of the first row to the word line, and a first cut layer disposed on a first control electrode of the plurality of control electrodes.

In some embodiments, the present disclosure provides a memory array. The memory array may include a first row and a second row comprising a plurality of storage cells, a word line, and a first control electrode, coupled to the word line and a first storage cell of the first row, wherein the first control electrode comprises a first plurality of polysilicon lines, wherein a first portion of the first plurality of polysilicon lines are disconnected from the word line.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A layout method, comprising:
    forming a layout structure of a memory array having a first row, wherein the first row comprises a plurality of storage cells;
    disposing a word line;
    disposing a plurality of control electrodes for connecting the plurality of storage cells of the first row to the word line; and disposing a first cut layer on a first portion of a first control electrode of the plurality of control electrodes.

2. The layout method of claim 1, wherein the plurality of storage cells comprise a plurality of fuses.

3. The layout method of claim 2, wherein each of the plurality of fuses comprises a first pad, a second pad, and a link arranged to connect the first pad and the second pad.

4. The layout method of claim 3, wherein one of the first pad and the second pad is coupled to a source/drain of a transistor of the storage cells, and the other of the first pad and the second pad is coupled to a sensing circuit.

5. The layout method of claim 3, wherein the fuse is configured such that a resistance of the fuse is changeable by applying a current through the link.

6. The layout method of claim 1, wherein the first cut layer is configured to be used as a mask to cut the first portion of a first control electrode.

7. The layout method of claim 1, wherein a location of the first cut layer is randomly scrambled by a processor.

8. The layout method of claim 1, wherein the first cut layer is between the word line and a storage cell connected to the corresponding control electrode.

9. The layout method of claim 1, wherein the first cut layer is additionally disposed on a second portion of a second control electrode of the plurality of control electrodes.

10. The layout method of claim 9, wherein the first control electrode and the second control electrode are consecutive.

11. A layout structure of a memory array, comprising:
a first row comprising a plurality of storage cells;
a word line;
a plurality of control electrodes for connecting the plurality of storage cells of the first row to the word line; and
a first cut layer disposed on a first control electrode of the plurality of control electrodes.

12. The layout structure of claim 11, wherein the plurality of storage cells comprise a plurality of fuses.

13. The layout structure of claim 12, wherein each of the plurality of fuses comprises a first pad, a second pad, and a link arranged to connect the first pad and the second pad, wherein the fuse is configured such that a resistance of the fuse is changeable by applying a current through the link.

14. The layout structure of claim 11, wherein the first cut layer is configured to be used as a mask to cut the first portion of a first control electrode.

15. The layout structure of claim 11, wherein a location of the first cut layer is randomly scrambled by a processor.

16. The layout structure of claim 11, wherein the first cut layer is between the word line and a storage cell connected to the corresponding control electrode.

17. The layout structure of claim 11, wherein the first cut layer is additionally disposed on a second portion of a second control electrode of the plurality of control electrodes.

18. The layout structure of claim 17, wherein the first control electrode and the second control electrode are consecutive.

19. A memory array, comprising:
a first row and a second row comprising a plurality of storage cells;
a word line; and
a first control electrode, coupled to the word line and a first storage cell of the first row, wherein the first control electrode comprises a first plurality of polysilicon lines, wherein a first portion of the first plurality of polysilicon lines are disconnected from the word line, wherein the first portion forms a random pattern.

20. The memory array of claim 19, further comprising a second control electrode comprising a second plurality of polysilicon lines and coupled to the word line and a second storage cell of the first row,
wherein a second portion of the second plurality of polysilicon lines are disconnected from the word line, wherein the first portion and the second portion form a pattern known to a manufacturer of the memory array.

* * * * *